March 27, 1945.    R. C. GAZLEY    2,372,566
FASTENING DEVICE
Filed Jan. 19, 1944
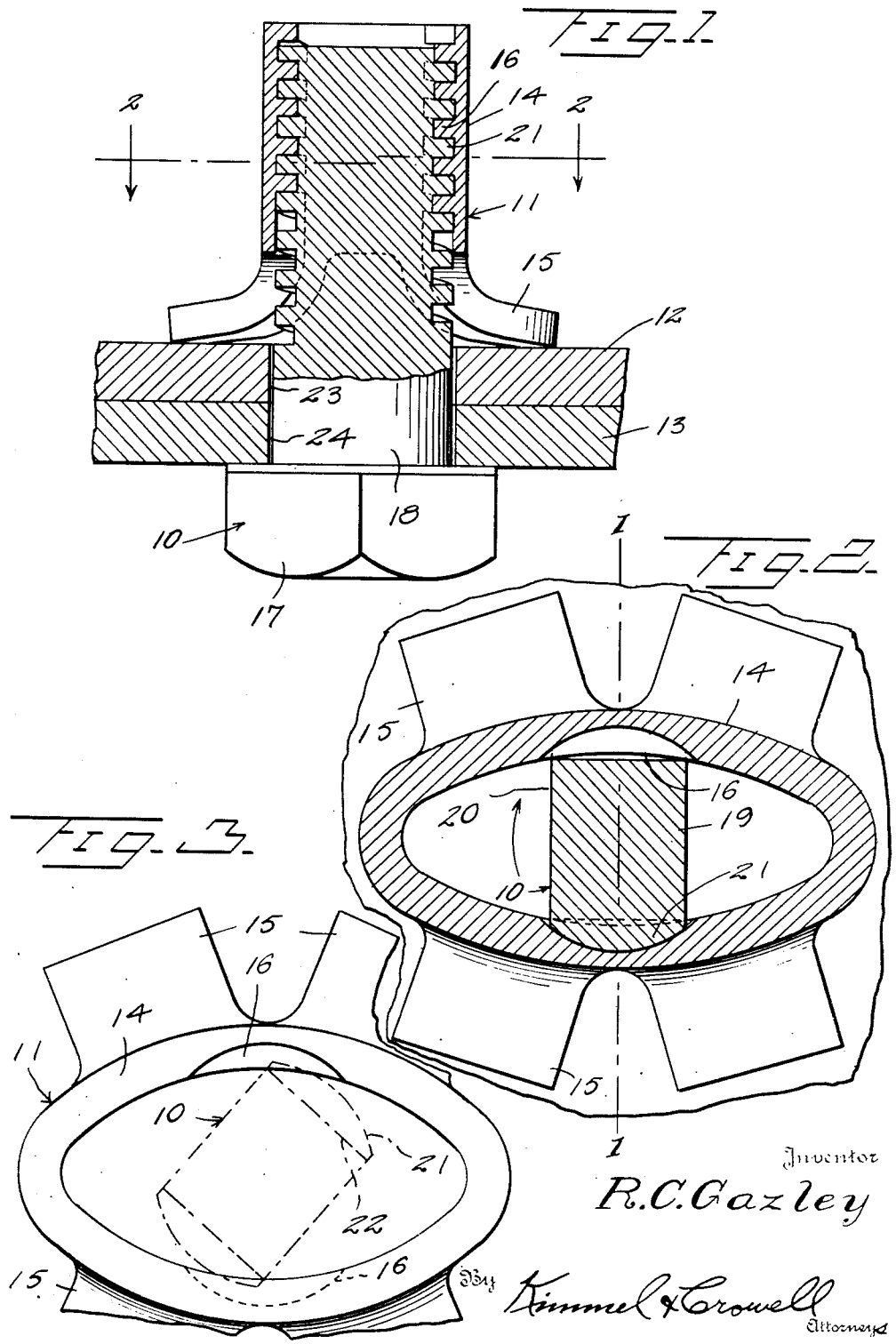

Patented Mar. 27, 1945

2,372,566

UNITED STATES PATENT OFFICE 2,372,566

FASTENING DEVICE

Richard C. Gazley, Shaker Heights, Ohio

Application January 19, 1944, Serial No. 518,869

3 Claims. (Cl. 24—221)

This invention relates to quick attachable and detachable fastening devices.

An object of this invention is to provide a fastening device in the form of a bolt and nut which is adapted to be moved to clamping position by a quarter turn of the bolt.

Another object of this invention is to provide a fastening device of this kind which will automatically lock in clamping position and which is so constructed that vibrations will not loosen the device, it being necessary that the bolt be forcibly rotated in a reverse direction to effect release of the nut and bolt.

Another object of this invention is to provide a fastening device of this kind wherein the bolt can be adjusted with respect to the nut so that articles of varying thicknesses may be clamped together.

A further object of this invention is to provide in a fastening device of this type an improved nut and bolt, the nut being in the form of an elliptical sleeve formed with resilient clamping fingers at one end, the sleeve having fragmentary threads at the small diameter and the sleeve being formed of resilient material so that the sleeve may be expanded when the bolt is turned to either a clamping or releasing position.

The bolt is formed with a compound shank the outer portion of the shank adjacent the head being round, and the remaining portion of the shank being rectangular in transverse section and provided with fragmentary threads extending from the short sides thereof, the thickness of the shank between the long sides thereof being slightly less than the small diameter of the interior of the nut so that the bolt may be freely inserted into the nut with the threads of the nut and bolt disengaged. After insertion of the bolt into the nut a forcible turning of the bolt will expand the nut and at the same time cause the threads of the bolt and nut to interengage, the expansion of the nut at any point during rotation of the bolt to a clamping position being less than the diameter of the bolt shank across the threads so that the expansion of the nut will not effect a release of the nut from the bolt.

With the foregoing objects in view, and others which may hereinafter more fully appear, the invention consists of the novel construction, combination and arrangement of parts, as will be more specifically described, and illustrated in the accompanying drawings wherein are shown embodiments of the invention, but it is to be understood that changes, variations and modifications may be resorted to which fall within the scope of the invention as claimed.

In the drawing:

Figure 1 is a fragmentary sectional view of a fastening device constructed according to an embodiment of this invention, taken on the line 1—1 of Figure 2;

Figure 2 is a sectional view taken on the line 2—2 of Figure 1;

Figure 3 is a fragmentary plan view showing diagrammatically the manner in which the nut is distorted during rotation of the bolt to either clamping or released position.

Referring to the drawing the numeral 10 designates generally a bolt and the numeral 11 designates generally a nut which cooperates with the bolt 10 in clamping a pair of elements 12 and 13 together. The nut 11 comprises a tubular sleeve-like body 14 which is non-circular in transverse section, being preferably of substantially elliptical configuration, and the outer end of the nut body 14 is provided with a plurality of outwardly directed resilient pressure fingers 15. The body 14 is constructed of resilient material so that, as will be hereinafter described, when the bolt 10 is rotated to either a clamping or released position, the body 14 will be distorted and will resiliently return to its normal configuration.

The body 14, in the area of the smallest diameter thereof, is provided with opposed fragmentary threads 16. The threads 16 terminate at a point inwardly from the outer end of the body 14, and extend to the inner end of the latter. The bolt 10 comprises a nut-shaped head 17, a round shank portion 18 extending from the head 17, and a polygonal elongated shank portion 19. The polygonal shank portion 19 is substantially rectangular in transverse section, and a diagonal drawn across the polygonal shank portion 19 is of greater length than the shortest diameter of the body 14 when the latter is in its normal position. The length of the long sides 20 of the polygonal shank portion 19, is substantially equal to the shortest diameter of the body 14 so that when the bolt 10 is rotated within the body 14, the latter will be spread apart so as to thereby distort the nut.

The bolt 10 is provided with opposed series of fragmentary threads 21 extending outwardly from the short sides 22 thereof. These fragmentary shank threads 21 have an extreme depth such that the threads 21 will inter-engage with the threads 16 simultaneously with and during the entire distortion of the body 14 when the bolt 10 is rotated to either a clamping or released position.

Referring to Figure 3, it will be noted that the bolt 10 is rotated through one-half of the nut-distorting cycle thereof and during this cycle a portion of the threads 21 of the bolt engage with the threads 16 of the nut 11. As the bolt 10 is continued in its rotation to a fully clamped position the body 14 of the nut 11 will contract until this body assumes its normal position, which is the position shown in Figure 2, and at this time the opposed short flat sides 22 of the shank 19 confront the threads 16 of the nut 11, the opposite corners of the shank 19 contacting with the inner sides of the non-circular sleeve 14. This contacting of the opposite corners of the rectangular shank 19 with the nut body 14, provides a means whereby the bolt 10 is normally held in its clamped position against rotation.

In order to release the bolt 10 from the nut 11, it is necessary to forcibly turn the nut 10 in a counter-clockwise direction and re-expand or distort the nut body 14. The length of the short sides of the shank portion 14 is substantially less than the shortest diameter of the body 14 so that the bolt shank portion 19 may be freely inserted within the body 14 prior to the turning of the bolt to its clamping position.

After the bolt is turned to its released position the bolt may be freely withdrawn from the nut 14. The clamping action of the bolt and nut occurs during the one-quarter turn of the bolt within the nut.

By providing a series of opposed fragmentary threads on the interior of the nut body 14, and a complementary series of fragmentary threads on the shank 19, it is possible to position the bolt 10 at any desired point within the nut 11 so that different thicknesses of material may be clamped together.

In the use and operation of this fastening device the articles 12 and 13 are provided with aligned openings 23 and 24 respectively, and the nut 11 placed with the resilient fingers 15 thereof against the adjacent side of the article 12. The bolt 10 is extended through the outer side of the article 13, and pushed endwise into the nut 11, the long side 20 of the shank 19 being disposed in confronting position to the threads 16 of the nut 11.

When the shank portion 19 has been inserted into the nut 11, to a point where the head 10 contacts with the outer side of the article 13, the bolt 10 is then forcibly rotated within the nut 11. The rotation from a released position of the bolt 10 in the nut 11 will effect distortion or spreading of the nut body 14 to a degree shown in Figure 3. When the nut body 14 begins to distort the threads 21 of the bolt 10 will begin to inter-engage with the threads 16 of the nut body 14. In this manner the nut 11 will be drawn endwise in the direction of the head 17 of the bolt 10 and the resilient fingers 15 of the nut 11 will be placed under gradual increasing tension as the bolt 10 is rotated from a released to a fully clamped position.

When the bolt 10 reaches its fully clamped position, which is the position shown in Figures 1 and 2, the short flat sides 22 of the shank portion 19 will confront the threads 16 of the nut member 14, and the corners of the shank portion 19 will contact with the adjacent interior portions of the nut body 14 thereby normally holding the shank portion 19 against rotation with respect to the nut body 14.

The fastening device hereinbefore described is of such construction that it will be resiliently locked in a clamping position so that it will not become released under vibration, it being necessary to effect release of the bolt from the nut that the bolt be forcibly turned relative to the nut.

I claim:

1. A fastening device comprising a nut and a bolt, said nut being formed of a sleeve-like non-circular body having at least two inner diameters of different lengths, fragmentary interior threads in said body in the area of the shortest diameter, said bolt comprising a shank, and a head at one end of said shank, said shank having a polygonal configuration in transverse section, and opposed series of fragmentary threads carried by opposed sides of said shank, the length of a diagonal through said shank being greater than the shortest diameter of said nut, and less than the outer diameter of said shank through its threads whereby said threads will interengage simultaneously with the distortion of said nut, the transverse distance across the long sides of said bolt being substantially equal to the shortest inner diameter of said nut whereby said nut will engage the opposed short sides of said bolt when the bolt and nut threads are fully engaged to thereby normally hold said bolt against turning relative to said nut.

2. A quickly detachable fastening device comprising a nut formed of a resilient tubular body having an elliptical configuration in transverse section, opposed fragmentary threads on the inner side of said body in the area of the short diameter, a plurality of outwardly extending fingers carried by the outer end of said body, and a bolt engageable in said nut, said bolt comprising a nut head, a shank carried by said head, said shank having a substantially rectangular configuration in transverse section, and fragmentary threads extending from the short sides of said shank, the length of the long sides of said shank being substantially equal to the length of the short diameter of said nut body whereby said body will be expanded during rotation of said bolt to either released or clamping position.

3. A quickly detachable fastening device comprising an elongated tubular resilient nut body having a non-circular configuration in transverse section, opposed fragmentary threads on the interior of said body in the area of the smallest diameter of the latter, and a bolt having a shank freely movable endwise in said nut body in the released position of said shank, said shank being substantially rectangular in transverse section, and oppositely extending fragmentary threads carried by opposed sides of said shank, said shank effecting expansion of said nut from a released to a clamping position or from a clamping to a released position, the greatest depth of said shank through its threads being greater than the distance of the expansion of said nut whereby said nut and shank threads will be continuously engaged during rotation of said bolt from released to clamping position, or from clamping to released position.

RICHARD C. GAZLEY.